United States Patent Office 3,556,863
Patented Jan. 19, 1971

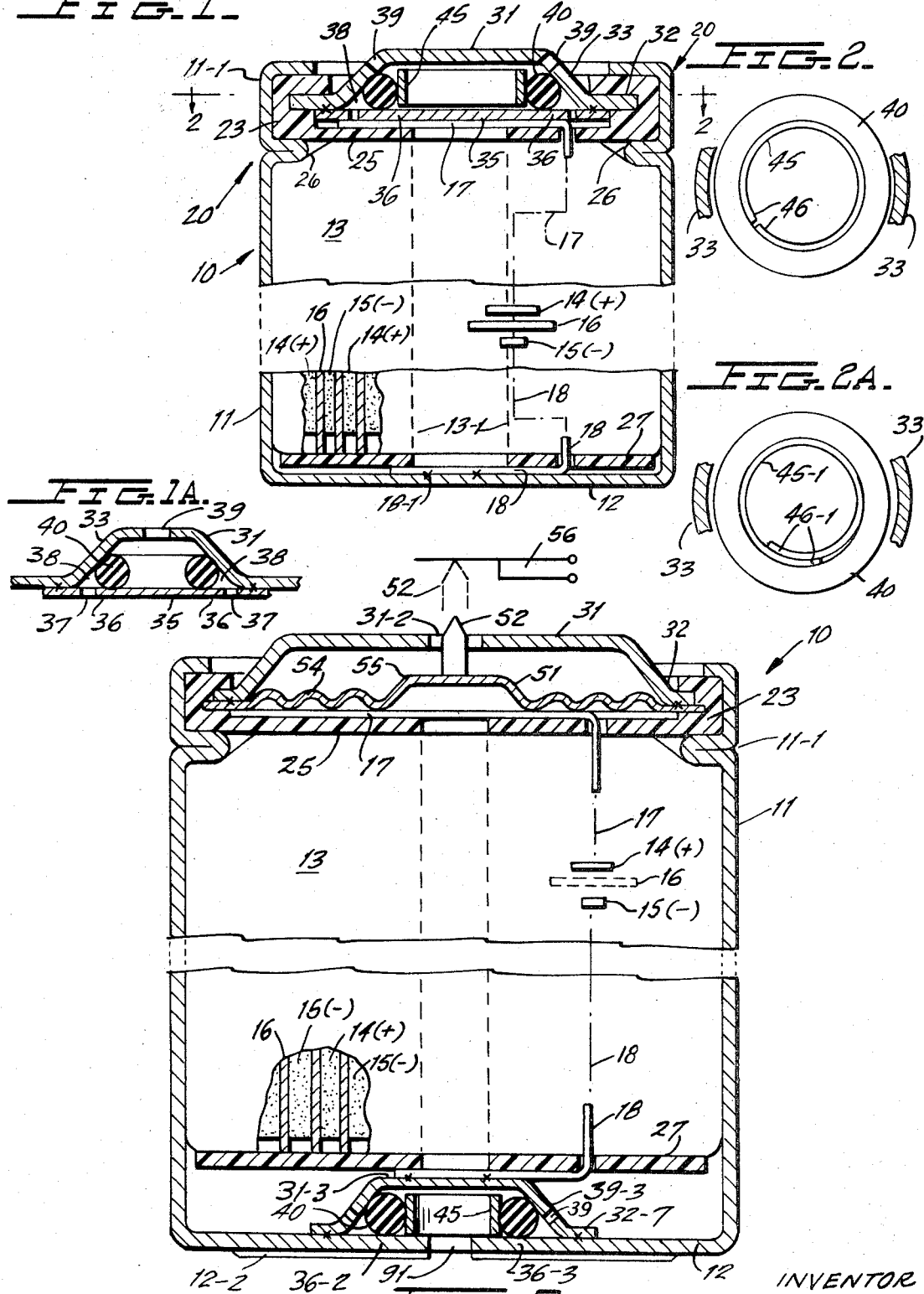

3,556,863
NORMALLY SEALED ENCASED RECHARGEABLE CELLS WITH SELF-RESEALING EXCESS PRESSURE GAS VENT
Raymond J. Nathe, Pleasantville, N.Y., assignor to Marathon Manufacturing Company, a corporation of Delaware
Filed Aug. 7, 1968, Ser. No. 750,795
Int. Cl. H01m 1/06
U.S. Cl. 136—178
10 Claims

ABSTRACT OF THE DISCLOSURE

An encased normally sealed rechargeable cell has a casing wall portion which together with an overlapping opposite retainer wall portion converge with their radically more outward seating wall regions toward each other and form a loop-shaped vent passage of wedge-shaped transverse cross section, having its radially most outward vent space connected to the casing interior for releasing excess pressure gases. This vent passage is normally sealed by an endless elastomer loop held wedged in and compressed radially generally inward by sealing engagement of the elastomer loop with opposite converging sealing wall regions. Internal pressure exceeding a certain maximum moves radially more inward at least portions of the elastomer loop to release gases past the elastomer loop at a certain high pressure with the loop preventing gas release below said certain pressure. Such compressed elastomer loop seal is shown combined with an outwardly expanding stiff elastically compressed ring of spring metal, which applies radially outward compression forces to the elastomer loop and assures close control of the pressure at which the elastomer loop unseals and reseals the vent passage.

---

This invention relates to encased normally sealed rechargeable cells and specifically to their resealable vents which release excess pressure gases from their sealed casing.

Such rechargeable cells supply power to numerous devices and tend to develop gas pressure, for instance when being charged or overdischarged. There has long existed a demand for a simple, low-cost resealable vent for releasing excess pressure gases from the sealed casing of such cells.

Among the objects of the invention is reliable yet simple self-sealing vents which will assure that the cell gases exceeding a certain maximum pressure will be released from the cell casing while preventing their release at pressures below such maximum.

In accordance with the invention, the vent passage in the casing of such cell is normally sealed by an elastomer loop held compressed in a radially generally inward direction by sealing engagement with a casing wall portion and an opposite retainer wall portion. These loop-engaging opposite wall portions converge with their radially outward regions toward each other and define a loop-shaped vent passage of wedge-shape vent space having its radially most outward narrowest region which is connected to the casing interior for discharging excess pressure gases therethrough. The sealing compression engagement of the elastomer loop by the converging opposite wall regions normally establish a tight seal for the vent passage. Under a certain maximum internal pressure the internal gases lift the tight seal along at least a portion of the elastomer loop and release excess pressure gases past the loop. Upon the internal pressure dropping below such maximum, the elastomer loop reestablishes full sealing engagement with the vent passage walls and prevents release of casing gases below such maximum internal pressure.

Such self-sealing casing vent seal may be combined with any proper casing wall of any known type of battery cell including those having casings of circular, elliptical, rectangular and other-shape cross section. For example, such vent may be combined with the top wall of a casing which also serve as one metallic terminal of the cell. Alternatively, such vent may be combined with a casing wall other than the top wall, such as the bottom wall of the cell casing. Furthermore, the vent-elements assembly may project at least partially outwardly beyond the casing wall portion or more inwardly thereof.

The foregoing and other features of the invention will be best understood from the following description of examples thereof by reference to the drawings wherein:

FIG. 1 is a cross-sectional and partially diagrammed view of one type of a sealed battery cell combined with a resealable vent of the invention;

FIG. 1A is a view similar to FIG. 1, showing only the upper cell casing portion combined with an example of such resealable vent;

FIG. 2 is a cross section view along line 2—2 of FIG. 1;

FIG. 2A is a view similar to FIG. 2 of a similar cell with another example of such resealable vent; and FIG. 3 is a view similar to FIG. 1 of another type of sealed cell wherein the casing bottom wall is combined with a resealable vent of the invention.

The resealable vents of the invention may be combined with the casings of various different types of batteries. For the sake of simplicity, one type of such releasable vent will be described in connection with a known type sealed nickel-cadmium battery cell.

FIG. 1 shows one form of sealed rechargeable battery cell 10 of the nickel-cadmium type combined with a resealable vent exemplifying the invention. It has a sealed metallic casing enclosure comprising a tubular metallic casing 11 constituting one cell terminal. Casing 11 has a closed bottom wall 12 and an open upper casing end 20. The open upper casing end 20 is enclosed by a relatively rigid metallic cover wall 31 which constitutes the opposite cell terminal. The peripheral rim 32 of metallic cover wall 31 is joined by a leak tight electrically insulating seal or joint 23 to the surrounding casing junction portion 11-1. The insulating sealing joint may be formed by a collar 23 of an insulating material such as nylon or polypropylene which is tightly clamped to the cover rim 32 by surrounding portions of the casing walls. The upper casing end 20 is folded over both sides of the cover rim and the sealing collar 23 and tightly clamped thereto by casing junction portion 11–1 against the casing shoulder 26. The insulating collar 23 may be an integral part of an insulating separator sheet 25 overlying the metal electrode assembly 13.

The electrode assembly 13 is of tubular shape and fills substantially all interior space of the sealed tubular casing 11. The electrode assembly 13 comprises the diagrammatically indicated two electrolyte holding superposed opposite-polarity electrode plates 14(+) and 15(−) separated by an electrolyte holding insulating porous separator 16. The two electrode plates 14, 15 and their separator 16, form the spirally coiled electrode assembly 13, a portion of which is seen in cross section in FIG. 1. The electrode assembly 13 may be of the fast-recharge type described in copending application Ser. No. 750,796 filed on even date herewith by Louis Belove and assigned to the assignee of the instant application.

To the positive and negative cell electrode plates 14 and 15 are connected, as by electric welds, flexible metallic connector tabs 17 and 18, of nickel for instance. The remote ends of the metallic electrode tabs 17, 18 are connected as by electric welds to casing cover 31 and bottom casing wall 12, respectively, which constitute the exposed opposite polarity metallic cell terminals. An insulating sheet 27 insulates the bottom surface of electrode assembly 13 from bottom casing wall 12. Connector tab 17 extends through a recess in upper insulating sheet 25. The opposite polarity electric connector tab 18 extends through a recess in the bottom insulator sheet 27. The coiled electrode assembly 13 has a coaxial passage 13–1 of sufficient width for passing therethrough an elongated welding electrode and welding the end of the bottom electrode tab 18 to the casing bottom 12.

FIG. 1 shows one way for combining the upper rigid cell-cover-terminal wall 31 with one example a resealable vent which normally serves as a tight casing seal which permits only release of excess pressure gases exceeding a certain maximum. To the rigid upper cover wall 31 is joined by a frusto-conical or inclined wall portion 33 to the cover rim 32. A complementary relatively rigid retainer wall 35 has a rim 36 which is affixed to overlying cover rim 32 by a plurality of peripherally spaced welds X. The inclined cover wall portion 33 and the underlying opposite retainer wall portion 36 enclose between them a loop shaped confining space 38 of transverse wedge-shaped cross section. The most outward narrowest part of the wedge-shaped loop space 38 is connected to the casing interior through gas passages between overlapping rim parts 32, 36 of cover and retainer walls 31, 35 extending between their junction welds X. As a result gases from the casing interior will be released to the exterior through these passages into the adjoining radially-more-inward wider space of the vent passage 38, unless this loop-shaped vent passage 38 is sealed.

In accordance with the invention the loop-shaped vent passage 38 is normally sealed by an endless gas tight elastomer loop 40 having a substantial elastomer-body volume which is held compressed in a radially generally inward direction against the converging wall portions 33 and 36 of the vent passage. This radially-inward compression of the massive elastomer loop 40 establishes gas tight sealing engagement between the converging passage wall portions 33, 36 with the facing extended sealing surfaces of the compressed elastomer loop 40, thereby normally preventing release of gases from the casing interior below a certain maximum pressure, which in the cell shown may be 180 p.s.i., for example. However, at internal pressures above such maximum, the excess-pressure gases compress at least portions of the compressed elastomer loop 40 still more radially inward to release at least some sealing engagement with the converging passage wall portions 33, 36 to release such excess pressure gases past the elastomer loop 40 and cover-wall openings 39 to the exterior. Upon the internal pressure dropping below such maximum, the elastically stored energy of the compressed elastomer loop 40 returns it into tight, sealing engagement with the converging vent passage walls 33, 36 and prevents release of gases below such maximum.

Without thereby limiting the scope of the invention, there are given below performance data obtained from a resealable casing seal of the invention shown in FIG. 1A. The elastomer O-ring 40 is a toroid of inside diameter 0.176±0.005 inch; cross sectional diameter of 0.070±.003 inch, and a resultant outside reference diameter of 0.316 inch. One ring was made of a neoprene compound identified as No. C557–7 of the Parker Seal Company. The cover wall 33 and the retainer wall 35, both consisted of steel 0.028±0.002 inch thick. Another ring was made of ethylene propylene elastomer of the Enjay Chemical Company such as described in their leaflet DS–1076. The inclined converging cover wall region 33 was 45° inclined against retainer wall 35 along its outer wall region 36. The inwardly facing surfaces of the two retainer walls 33, 35 which maintained sealing contact with the elastomer loop 40 had a machined surface finish 32. The interior conical surfaces of inclined retainer wall region 33 face the circular inward base surfaces of opposite retainer wall region 36. This provides a frusto-conical region for the O-ring 40, having a base dimension of 0.320 inch and a height of 0.045 inch. This maintains the loop 40 in sealed position up to about 250 p.s.i. and after exposure to potassium hydroxide electrolyte for twenty-eight days up to about 180 p.s.i. with a vent resealing pressure after such exposure of about 130 p.s.i. FIG. 1A shows that its elastomer-loop retainer wall 35 may be provided with additional gas-inlet openings 37 to the manually sealed wedge-shaped vent passage 38.

In accordance with the invention, a high order of reliability in fixing the vent-releasing pressure and the vent-resealing pressure obtained with such compressed elastomer-loop seal by applying to its radially-inward elastomer surface a predetermined radially-outward sealing force or pressure with an elastically compressed seal-determining collar 45, of steel or other elastically compressible material having high modulus of elasticity.

FIG. 2 shows one example of the relationship of such metallic compression ring 45 which exerts radially outward compression forces to such surrounding elastomer loop 40. The metallic compression ring or loop 45 is elastically compressed from a wider diameter and held in the interior of the surrounding radially compressed elastomer loop 40 so that it exerts thereon certain predetermined radially-outward compression forces and causes the elastomer loop 40 to maintain the seal with the vent passage 38 and prevent release of casing gases up to a certain upper maximum pressure range between 175 to 185 p.s.i., for example, but release the excess pressure gases above such maximum while resealing the vent passage when the internal casing pressure drops below such maximum. FIG. 2 shows that when the metallic compression ring is in its most expanded position a small gap is left between its opposite ends 46 with its length being large enough to exert the required radially-outward sealing forces on the entire length of the surrounding elastomer loop 40.

FIG. 2A shows another example of a metallic compressor 45–1 which applies such radially-outward sealing compression forces on the surrounding similar compression loop 40. The compression ring 45–1 has overlapping opposite ring or loop ends 46–1 which exert the certain desired outward compression forces on the entire length of the elastomer loop 40. The space between the radially more inward ring end 46–1 and the surrounding elastomer loop 40 may be filled with additional compressed elastomer material.

The sealed cells of the type described in aforementioned application Ser. No. 750,796 have a circuit-controlling deflectable or diaphragm wall which cuts off or reduces the high charging current at a certain high initial raised casing pressure, such as 160 to 170 p.s.i., require a maximum pressure release vent which releases excess pressure gas upon internal pressure rising to a maximum, for example, 180 p.s.i.

FIG. 3 shows how such a cell may be provided with a resealable maximum pressure release vent on a casing wall portion other than the deflectable casing wall, for example, on the casing wall which is opposite its diaphragm casing wall. In such cell of FIG. 3 a deflectable wall or diaphragm 51 forms part of the sealed casing which encloses an electrode assembly 13 identical to that of FIG. 1. Upon high charging current causing internal casing pressure rise to a certain raised initial level (60 p.s.i., for example) the outwardly deflected diaphragm actuates by its button 52 switch means 56 of the associated operating circuit to modify its operation, for example, to cut off or reduce the high charging current to a leakage current. If, through inadvertence in the operating circuit, the casing pressure continues to rise, such cell is protected by an excess pressure resealable vent shown combined with its bottom casing wall portion 12. Casing wall 12 has a vent opening 91 which is tightly sealed by a compressed closed elastomer loop 40 which is wedged in under radially-outward compression between the engaged surfaces of the rigid casing wall 12 and the radially-outwardly converging retainer wall section 39–3 of a rigid retainer wall 31–3. Retainer wall 31–3 is made of rigid metal, steel for example, and has a rim affixed, as by a plurality of spaced welds X to casing wall 12. The end of electrode lead 18 is affixed by welds XX to underlying retainer wall 31–3 and therethrough to casing bottom wall 12.

Otherwise the resealable vent passage bottom casing wall 12 is identical with that of the wall 31 of FIG. 1, and its elements are indicated by analogous reference numeral.

The elastomer loop 40 is identical with that of FIG. 1 and may consist of known alkali-resistant elastomers. As an example, ethylene-propylene elastomers have withstood without substantial deterioration prolonged exposure in a potassium hydroxide solution of 1.3 g./cm.$^3$ specific gravity. They are being supplied by Enjay Chemical Company and E. I. Du Pont de Nemours & Co. Available fluorelastomers have particularly high corrosion resistance to such alkali solution. They include the amorphous terpolymers of ethylene, propylene, and a small amount of non-conjugated diene, such as described in booklet "Ethylene Propylene Copolymer," by S. A. Bank, and "Enjay ERP-404" and ELD 60005," publications of Enjay Chemical Company. Similar fluorelastomers are supplied by E. I. Du Pont de Nemours & Co. under the name Viton.

Except for their junction welds XX, the retainer wall rim 32–7 and underlying bottom wall portions of casing wall 12 provide between them passages for releasing excess pressure gases from the casing interior which then pass through bottom wall opening 91 to the exterior but only if the internal gas pressure lifts a portion (or portions) of the elastomer loop 40 from its wedged sealing engagement with bottom wall 12 and overlying inclined retainer wall 39–3. The casing bottom wall 12 may include radially extending bottom projections 12–2 of slight height to provide spaces through which released gases may pass sidewise if casing wall 12 rests on a support.

The examples of the invention described above will suggest various modifications and the annexed claims should not be limited to such examples.

I claim:
1. In a rechargeable battery cell,
at least two exposed relatively insulated metallic casing walls of opposite polarity;
an electrolyte containing electrode assembly with at least two opposite polarity electrodes enclosed within said casing and ending to develop excessive pressure within said casing under certain operating conditions;
one of said walls having one relatively rigid wall region with a vent opening for passing gases from the casing interior;
an opposite wall region joined at a certain spacing from said one wall region from the casing interior;
an endless elastomer loop held compressed in radially generally inward direction between two endless sealing surfaces of said two wall regions within and sealing said vent passage below a certain raised pressure;
said vent passage having loop-shaped connecting space extending radially beyond said sealing surfaces and connected to said casing interior and a radially interior space surrounded by said loop connected to said vent opening;
said elastomer loop undergoing elastic radially inward deformations under radially inward compression forces from said connecting space exceeding said predetermined pressure causing at least partial deformation of said loop and at least partial opening of the seals at said sealing surfaces and gas release past said loop at above said predetermined pressure;
and the stored compression energy of said inwardly compressed and deformed loop deformation restoring said seals below said predetermined pressure.
2. In a rechargeable cell as claimed in claim 1;
said two wall regions converging toward each other along said sealing surfaces and radially outward therefrom toward said connecting space.
3. In a rechargeable cell as claimed in claim 1;
one of said two wall regions having a wall section of frusto-conical shape adjoining defining at least part of said connecting space and converging toward the radially more outward part of the other of said two wall regions.
4. In a rechargeable cell as claimed in claim 3;
the wall region having said frusto-conically shaped wall section being part of an external metallic wall of said casing.
5. In a rechargeable cell as claimed in claim 3;
the wall region having said frusto-conically shaped wall facing the interior of said casing wall region.
6. In a rechargeable battery cell,
at least two exposed relatively insulated metallic casing walls of opposite polarity;
an electrolyte containing electrode assembly with at least two opposite polarity electrodes enclosed within said casing and ending to develop excessive pressure within said casing under certain operating conditions;
one of said walls having one relatively rigid wall region with a vent opening for passing gases from the casing interior;
an opposite wall region joined at a certain spacing from said one wall region from the casing interior;
an endless elastomer loop held compressed in radially generally inward direction between two endless sealing surfaces of said two wall regions within and sealing said vent passage below a certain raised pressure;
said vent passage having loop-shaped connecting space extending radially beyond said sealing surfaces and connected to said casing interior and a radially interior space surrounded by said loop connected to said vent opening;
said elastomer loop undergoing elastic radially inward deformations under radially inward compression forces from said connecting space exceeding said predetermined pressure causing at least partial deformation of said loop and at least partial opening of the seals at said sealing surfaces and gas release past said loop at above said predetermined pressure,
and the stored compression energy of said inwardly compressed and deformed loop deformaton restoring said loop at above said predetermined pressure;
and a further elastically compressed expansion member held surrounded by and exerting radially outward expansion forces on said elastomer loop and determining with said loop said certain predetermined pressure beyond which said loop undergoes the seal opening inward deformation.
7. In a rechargeable cell as claimed in claim 6;
said two wall regions converging toward each other along said sealing surfaces and radially outward therefrom toward said connecting space.
8. In a rechargeable cell as claimed in claim 6;
one of said two wall regions having a wall section of frusto-conical shape adjoining defining at least part of said connecting space and converging toward the radially more outward part of the other of said two wall regions.

9. In a rechargeable cell as claimed in claim 8; the wall region having said frusto-conically shaped wall section being part of an external metallic wall of said casing.

10. In a rechargeable cell as claimed in claim 8; the wall region having said frusto-conically shaped part facing the interior of said casing wall region.

References Cited

UNITED STATES PATENTS

| 3,293,081 | 12/1966 | Daley | 136—178 |
| 3,320,097 | 5/1967 | Sugalski | 136—178 |
| 3,471,339 | 10/1969 | Watanabe | 136—170 |

DONALD L. WALTON, Primary Examiner

U.S. Cl. X.R.

220—44